Jan. 7, 1958

E. W. FRANCK 2,819,186

MAGNETIC RECORDING TAPE

Filed Jan. 19, 1956

INVENTOR.
Ernest W. Franck
BY
Emery, Varney, Whittemore & Dix
ATTORNEYS 2,819,186

MAGNETIC RECORDING TAPE

Ernest W. Franck, Glenbrook, Conn., assignor to Reeves Soundcraft Corp., New York, N. Y., a corporation of New York Application January 19, 1956, Serial No. 563,403

3 Claims. (Cl. 117—76)

Figure 1:
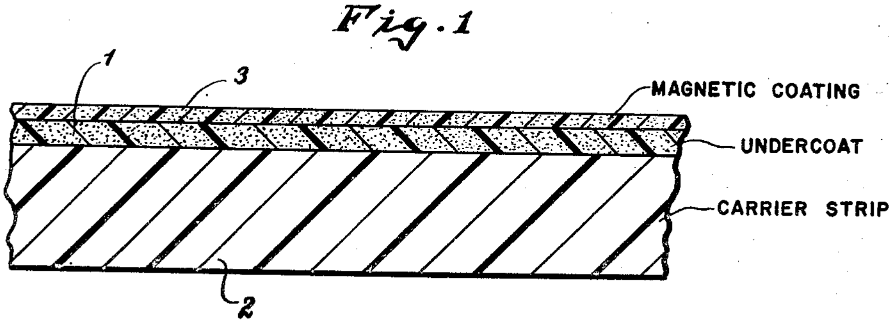

This invention relates to magnetic recording tape and pertains more particularly to tape especially designed for the recording of impulses of very high frequency. Ordinary magnetic tape now in common use usually consists of a carrier strip or support of flexible non-magnetic material, usually a film of plastic material such as cellulose acetate or the like, to which is applied an adherent magnetic coating consisting of magnetic material such as finely divided magnetic iron oxide dispersed in a binder. The binder usually consists of polymeric resinous material dissolved in a suitable solvent. The magnetic coating is applied to the carrier strip in liquid form, after which the solvent is evaporated to leave a dry magnetic coating. Such magnetic coatings have usually been of a thickness of from .4 mil to .6 mil (.0004" to .0006"). Magnetic tape of this type has been found to be unsatisfactory for the recording and playback of impulses under conditions where the recorded wavelength is substantially less than 1 mil.

Magnetic recording tape presently finds its widest use in audio frequency applications, where the frequency band extends from about 50 to 15,000 cycles per second. Tape is now most commonly operated at a linear speed of 15 inches per second, and in recording a 15,000 cycle tone, for example, the length of a single wave as recorded on the tape will be 1 mil. This exceeds the width of the slit in the ordinary playback heads which has been commonly about .5 mil and gives satisfactory results on playback. If a 30,000 cycle tone is recorded at a tape speed of 15 inches per second, however, the length of a single wave as recorded on the tape will be only .5 mil. But if a sinusoidal recording of .5 mil wavelength is passed over a playback head which has a .5 mil slit, the output from the head will be zero. This is due to the well-known gap effect, and it is an accepted fundamental principle that for successful results, the wavelengths recorded on the tape must always be substantially greater than the effective width of the slit of the playback head. The width of the slit of the recording head is of less importance, although in practice the width of the slit of the recording head is usually the same as that of the slit of the playback head. In order to permit the use of higher frequencies, or alternatively slower tape speeds, efforts have been made to reduce the width of the slits, and heads with .25 mil slits are now available, making it possible to record and playback up to 30,000 cycles or even slightly higher at tape speeds of 15 inches per second. When it is required to record still higher frequencies, the usual recourse is higher tape speeds. Some telemetering equipment is now in use where frequencies up to 100,000 cycles are recorded, and for successful results, tape speeds of approximately 60 inches per second are required when using a .25 mil slit.

Other uses and potential uses require the recording and playback of still higher frequencies. For example, for use in the recording and playback of video signals, frequencies of 2,000,000 cycles per second and sometimes higher must be recorded and reproduced. While it is possible that heads with even narrower slits may be produced (some with slits having a width as small as .1 mil have been produced experimentally), there is a limit beyond which further progress in this direction can be expected, and it is obvious that extremely high tape speeds will be required.

Ordinary magnetic tape commonly used for audio frequency applications is not satisfactory at these high speeds, for it has been found that due to friction, the tape surface becomes heated, and the heads and guide surfaces accumulate a gummy deposit which interferes with proper operation of the equipment. In order to prevent this deposit from forming it is desirable to provide a tape having a magnetic coating which was a hard surface. A coating having a hard surface usually has a lower coefficient of friction which results in the generation of less heat. If, additionally, the resinous materials of the binder are chosen from those known to have relatively high softening points, this difficulty may be almost wholly eliminated.

Ordinary magnetic tape commonly used for audio frequency applications is not satisfactory for high frequency applications for another reason. It is known that the depth to which the useful signal flux penetrates the magnetic coating is approximately equal to the width of the slit. Thus, if the slit has a width less than the thickness of the magnetic coating on the tape, a portion of the coating will perform no useful function. Thus, using a .1 mil slit, for example, with ordinary tape having a .5 mil thick coating, only the upper one-fifth of the magnetic coating will be effective, while the remaining four fifths will contribute very little to the output signal. Nevertheless, while the unused portion of the coating does not contribute substantially to the useful signal, it can and does make substantial longer wavelength contributions to the noise of the system. In addition, there is reason to believe that on playback the unused portion of the coating serves as a magnetic shunt, providing a path for the diversion of some flux which would otherwise find its way through the playback head. Therefore, in a tape especially adapted for short wavelength response, the coating thickness should be small and should preferably not exceed substantially the width of the slit with which it is intended to be used. That is, considering that the slits used for recording and playback of such tape will not ordinarily exceed a width of .25 mil, the thickness of the magnetic coating should not exceed .25 mil.

This requirement of extremely thin magnetic coatings having a hard surface presents a difficult problem for solution. For while it is possible to apply very thin coatings using the ordinary magnetic coating formulations in which the content of the active magnetic material is usually in the range from 50% to 75% of the weight of the dried coating, it has been found that a very thin coating of such material does not provide a sufficient density of magnetic material to supply the desired signal strength. Moreover, the surface of the coating is not sufficiently hard. However, when it is attempted to increase the proportion of magnetic material in the coating to give the required hardness and the required signal strength, the dried coating is found to be brittle and lacking the necessary adherence to the carrier strip. It has tendency to crack and flake off the carrier strip. This is especially true if the resinous materials used in the coating are chosen from those known to have relatively high softening points. This tendency is particularly troublesome when the surface of the magnetic coating is to be burnished, as for example, by the use of the process of my prior U. S. Patent No. 2,688,567, in which the surface of the coating is subjected to high frictional stresses.

A preferred embodiment of the invention selected for purposes of illustration is shown in the accompanying drawings, in which Figure 1 is a vertical section through a piece of magnetic recording tape, shown on a greatly enlarged scale.

Figure 2:
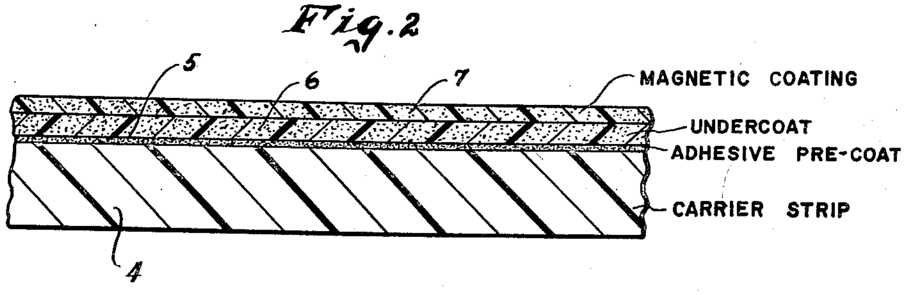

Figure 2 is a similar section showing a modified form of tape.

According to the present invention I use a magnetic coating in which a very high percentage of the usual finely divided magnetic material, i. e. in excess of 85% of the weight of the dried coating and preferably within the range of 85% to 90% of the weight of the dried coating, is dispersed in a binder. This provides a coating material of very hard surface with a sufficiently high density of magnetic material to provide good signal strength. Such a coating would be wholly unsuitable for use if applied directly to a carrier strip, however, for it is so hard and brittle that it would not adhere satisfactorily thereto. I have discovered, however, that if the carrier strip is first coated with a softer undercoat of polymeric resinous material of a type known to adhere satisfactorily to the carrier strip, and if the said resinous material of the undercoat is soluble in a solvent employed in the magnetic coating, the subsequently applied magnetic coating will bond itself firmly thereto. Preferably, for best results in recording and playback of high frequency impulses, the thickness of the magnetic coating should not substantially exceed .25 mil. The thickness of the undercoat should be at least equal to the thickness of the magnetic coating, and should preferably exceed the thickness of the magnetic coating.

Preferably, but not necessarily, the undercoat should contain a filler consisting of finely divided non-magnetic material, for it is found that such materials have a tendency to prevent cold flow of the polymeric resins. Pigments such as non-magnetic ferric oxide are well suited for this purpose. Since the undercoat should always be softer than the magnetic coating, however, the content of non-magnetic filler should always be less than 75% of the weight of the dried coating and preferably within the range of 25% to 65% of the weight of the dried coating. In fact, by substituting non-magnetic oxide for magnetic oxide, many of the common coating formulations containing less than 75% oxide may be used as an undercoating for tape according to the present invention.

Such undercoats are softer, less brittle and more flexible than the hard magnetic coating and many formulations are known and used in the art which adhere satisfactorily to the plastic film commonly used as a carrier strip. The action of the solvent contained in the magnetic coating on the resinous binder of the undercoat forms an inseparable bond therebetween, resulting in a composite coating comprising two layers. The outer magnetic layer is thin, hard, and contains an extremely high proportion of magnetic material. The inner layer is non-magnetic, and is softer and more flexible. The composite coating is adequately flexible, and the outer magnetic coating has no tendency to crack or flake off even when subjected to severe stresses when subjected to a burnishing operation. The relatively soft, flexible undercoat lying between the magnetic coating and the carrier strip appears to have a yielding cushioning effect between the two.

The above described undercoat must not be confused with so-called adhesive precoat which is sometimes used to improve the adhesion of a magnetic coating to the carrier strip. Adhesive precoats are extremely thin, usually .1 mil or less, and rely on the use of a material such as polyvinyl acetate having a tacky surface for adhesion both to the carrier strip and to the magnetic coating. Undercoats according to the present invention are non-tacky. Moreover, the thickness of the undercoat according to the present invention substantially exceeds the thickness of the adhesive precoats, being not less than .2 mil as a minimum.

In some cases, and particularly where polyester film such as Du Pont Mylar film is used as a carrier strip, it may also be advisable to apply an adhesive precoat to the carrier strip before applying the undercoat. In such cases the undercoat is then applied over the adhesive precoat, and finally the magnetic coating is applied over the undercoat. Any suitable type of adhesive precoat may be applied, although I prefer to use a polymeric resin such as polyvinyl acetate, for example, dissolved in a suitable solvent such as toluene.

*Example 1*

An undercoat was first prepared consisting of the following:

25 pounds of non-magnetic ferric oxide (American Pigment Co. JLS 600 was used)
30 pounds of toluene
5 pounds 13 ounces of a 40% solution of a mixed polymer of methyl acrylate and ethyl methacrylate (Rohm & Haas Acryloid B–72 was used) in toluene
2 pounds 5 ounces of fossil hydrocarbon resin (R. B. H. Co. Resin 510 was used)
5 ounces of chlorinated rubber
6 pounds of a 12% solution of acrylic synthetic rubber (B. F. Goodrich Hycar PA was used) in a mixed solvent consisting of 60% methyl isobutyl ketone, 30% toluene and 10% isopropyl alcohol The above ingredients were placed in a ball mill and mill for 24 hours, after which were added 21 pounds 11 ounces of a 40% solution of a mixed polymer of methyl acrylate and ethyl methacrylate (Rohm & Haas Acryloid B–72 was used) in toluene
10 pounds of methyl isobutyl ketone After a short additional milling period of 2 to 4 hours to insure thorough mixing and dispersion, the resulting undercoating 1 was applied to one surface of a cellulose acetate carrier strip 2 in a thickness sufficient to provide a dry coating, after evaporation of solvents, having a thickness of approximately .3 mil. The coating adhered tightly to the surface of the carrier strip.

Meanwhile a magnetic coating material was prepared consisting of the following:

30 pounds of magnetic material (a mixture of ferroso-ferric oxide and magnetic ferric oxide was used)
4 pounds 4 ounces of a 40% solution of polymethyl acrylate (Rohm & Haas Co. Acryloid A–101 was used) in methyl ethyl ketone
9 ounces chlorinated rubber
4 pounds 11 ounces of a 12% solution of acrylic synthetic rubber (B. F. Goodrich Hycar PA was used) in a mixed solvent consisting of 60% methyl isobutyl ketone, 30% toluene and 10% isopropyl alcohol
35 pounds of toluene
4 pounds 4 ounces of a 40% solution of a mixed polymer of methyl acrylate and ethyl methacrylate (Rohm & Haas Co. B–72 was used) in toluene The above ingredients were placed in a ball mill and milled for 36 hours, after which were added 15 pounds of toluene
15 pounds of methyl isobutyl ketone After a short additional milling period of 2 to 4 hours to insure thorough mixing and dispersion, the resulting magnetic coating 3 was applied on top of the dried undercoat in a thickness sufficient to provide a dry coating, after evaporation of solvents, having a thickness of approximately .2 mil. The magnetic coating adhered tightly to the undercoating, exhibiting no tendency to peel or flake off after drying, even when subjected to a burnishing operation, notwithstanding that it contained approximately 87% magnetic material. This tape was tested at speeds in excess of 500 inches per second with no evidence of accumulation of gummy deposits on the head. The electrical response for ⅓ mil wavelength signals permitted a signal to noise ratio of 40 db in the 2 megacycle region.

*Example 2*

In order to produce an extremely thin tape of high tensile strength as shown in Fig. 2, it was desired to use a carrier strip 4 of polyester film such as Dupont Mylar film of a thickness of 1 mil. Experiments indicated that while adhesion to the film of an undercoat prepared according to Example 1 was adequate for some purposes, the adhesion was not as good as when cellulose acetate was used as a carrier strip. Accordingly, the following adhesive precoat was prepared:

5 pounds of polyvinyl acetate
50 pounds of toluene
45 pounds of ethyl acetate

After thorough mixing, a very thin coating 5 only sufficient to provide a dry coating, after evaporation of solvents, of approximately .1 mil, was applied and thereafter an undercoat 6 according to Example 1 was applied on top of the adhesive precoat.

Thereafter a magnetic coating 7 according to Example 1 was applied on top of the undercoat. The magnetic coating adhered tightly to the undercoat, which, in turn, adhered tightly to the adhesive precoat. The magnetic properties of the tape were similar to those of Example 1.

It will be understood that the invention may be variously modified and embodied within the scope of the subjoined claims.

I claim as my invention:

1. Magnetic recording tape for recording high frequency impulses above the audio frequency band comprising, in combination, a support consisting of a strip of non-magnetic film, and a composite coating thereon, said coating comprising two adherently bonded layers of resinous polymeric material, the outer layer being relatively hard and brittle and having finely divided magnetic material dispersed therein in proportion at least equal to 85% of the weight of the dried layer and the inner layer being non-magnetic and relatively soft and flexible, the thickness of the outer magnetic layer being not in excess of .25 mil, and the thickness of the inner non-magnetic layer being at least equal to the thickness of the outer magnetic layer.

2. Magnetic recording tape according to claim 1 in which the inner non-magnetic layer contains finely divided non-magnetic filler material in proportions not exceeding 75% of the weight of the dried layer.

3. Magnetic recording tape according to claim 1 in which the finely divided magnetic material is a magnetic iron oxide, and in which the inner non-magnetic layer contains finely divided non-magnetic iron oxide in proportions not exceeding 75% of the weight of the dried layer.

References Cited in the file of this patent

UNITED STATES PATENTS

| | | |
|---|---|---|
| 2,699,408 | Camras | Jan. 11, 1955 |

FOREIGN PATENTS

| | | |
|---|---|---|
| 266,143 | Switzerland | Jan. 15, 1950 |
| 153,598 | Australia | Oct. 13, 1953 |